United States Patent [19]

Beasley

[11] 4,447,119
[45] May 8, 1984

[54] APPARATUS FOR MAINTAINING AN OPTICAL FIBER AND A FOCUSING MEANS

[75] Inventor: J. Donald Beasley, Arlington Heights, Ill.

[73] Assignee: Gould, Inc., Rolling Meadows, Ill.

[21] Appl. No.: 316,991

[22] Filed: Nov. 2, 1981

[51] Int. Cl.³ .............................................. G02B 7/26
[52] U.S. Cl. ................................ 350/96.18; 350/96.20
[58] Field of Search ............... 350/96.15, 96.18, 96.20, 350/96.21; 250/227

[56] References Cited

U.S. PATENT DOCUMENTS

| | | | |
|---|---|---|---|
| 2,819,459 | 1/1958 | Dodd | 358/252 |
| 3,675,344 | 7/1972 | Williams | 434/36 |
| 3,894,805 | 7/1975 | Middleton | 356/138 |
| 3,938,895 | 2/1976 | Bridger et al. | 356/152 |
| 3,954,338 | 5/1976 | Hennel et al. | 356/138 |
| 3,981,592 | 9/1976 | Williams | 356/237 |
| 3,984,157 | 10/1976 | LeVantine | 351/213 |
| 4,060,309 | 11/1977 | LeNoane et al. | 350/96.18 |
| 4,068,952 | 1/1978 | Erbert et al. | 356/5 |
| 4,121,890 | 10/1978 | Braun | 356/5 |
| 4,167,328 | 9/1979 | Cross et al. | 356/5 |
| 4,171,162 | 10/1979 | Gerard et al. | 356/401 |
| 4,178,505 | 12/1979 | Skagerlund | 250/203 R |
| 4,184,742 | 1/1980 | Corrales | 350/96.21 |
| 4,190,317 | 2/1980 | Makuch | 350/96.20 |
| 4,265,511 | 5/1981 | Nicia et al. | 350/96.18 |
| 4,303,301 | 12/1981 | Teichert et al. | 350/96.18 |
| 4,318,586 | 3/1982 | Coyne | 350/96.18 X |

FOREIGN PATENT DOCUMENTS 56-85704  7/1981  Japan .................. 350/96.15

OTHER PUBLICATIONS

Newport Research Catalog 1980–1981, Published by the Newport Research Corp.

*Primary Examiner*—John D. Lee
*Attorney, Agent, or Firm*—K. H. Pierce; Edward E. Sachs

[57] ABSTRACT

An apparatus for maintaining one end of an optical fiber and a focusing lens is provided including means for adjustably focusing a beam of light onto the end of the fiber. The adjustable focusing means includes a means for pivoting the focusing lens and fiber to provide a very fine adjustment to direct the light beam into the core at the end of the optical fiber. The subject device includes a framework for maintaining the lens and one end of the optical fiber in a precisely controlled relationship. The adjustable focusing means may further include at least one screw in threaded engagement with the base portion of the device. One end of the screw contacts a peripheral portion of the maintaining means so that rotation of the screw causes the maintaining means to pivot about the end of the optical fiber.

9 Claims, 8 Drawing Figures

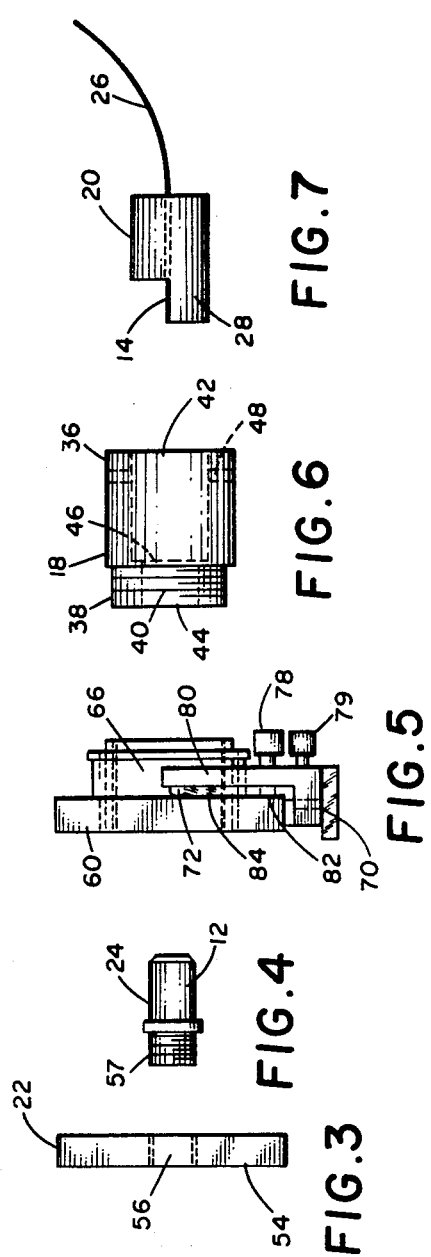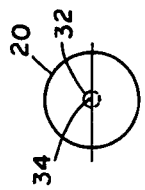

APPARATUS FOR MAINTAINING AN OPTICAL FIBER AND A FOCUSING MEANS

BACKGROUND OF THE INVENTION

A. Field of the Invention

The present invention relates generally to optical fiber support apparatus and, more specifically, to apparatus for maintaining an optical fiber and a focusing means to direct light into a core of the fiber and to permit fine adjustment of a light beam directed into one end of the optical fiber core.

B. Description of the Prior Art

The use of optical fibers frequently requires that a beam of light having certain desirable characteristics be focused into the core of one end of an optical fiber. It is frequently very difficult to focus laser beams, for instance, into the core of a single-mode optical fiber in a reliable and stable manner. This need has led to the development, by others, of specialized optical fiber holders to maintain an end portion of optical fiber. The Newport Research Corporation (N.R.C.), for instance, has developed the FPH-S fiber holder to accommodate 4–8 mil single-mode fibers. The fiber holder is basically a cylindrical chuck provided with a radially extending slot to accommodate one end of an optical fiber. A leaf spring mechanism is required to maintain the fiber in a fixed position. The fiber holder and fiber may then be installed in a mount, for instance, the FP-1 mounting system of the FP-2 mounting system manufactured by N.R.C. Both mounts provide x-y-z movements; the FP-2 system provides angular positioning capabilities of the fiber as well. One problem with the mounting systems developed by N.R.C. is that a separate mounting system, for example an LP-1 or an LP-1B positioner, is required to position a focusing lens for directing a light beam into the core of the fiber. Thus, it is not possible to precisely maintain the end of an optical fiber and a focusing lens in a fixed relationship because of the lack of rigidity that results from using two separate mountings.

Another problem with prior-art, fiber-optic positioners, such as the type described above, is that, according to the manufacturer, the precision with which an optical fiber can be positioned is on the order of 200 microns or more. While such a limitation in precision may be acceptable for some fiber optics applications, in other applications, greater precision in the positioning of the optical fiber and the focusing lens is required. For example, in applications in which it is desired to direct a laser beam of light directly into the core of the single-mode optical fiber, it is desirable to be able to adjust the position of the optical fiber and the focusing lens in increments as small as one micron.

In view of the above limitations of prior-art focusing and mounting devices, it is an object of the present invention to provide a single mounting system for maintaining an optical fiber and a focusing lens in a precisely controlled relationship to one another.

Another object of the subject development is the provision of a means for adjusting the relative positions of one end of an otpical fiber and the focal point of a light beam by distances as small as one micron.

Yet another object of the subject development is to provide a means for positioning and maintaining a focusing lens near one end of an optical fiber that is relatively simple to use, that can be easily integrated with present-day technology, and that is inexpensive to manufacture.

The above objects are given by way of example; thus, desirable objectives and advantages achieved by the invention may occur to those skilled in the art. The scope of the invention is to be limited only by the appended claims.

SUMMARY OF THE INVENTION

An optical fiber and focusing lens mounting system having multi-movement positioning capabilities is described. The subject invention includes a means for maintaining an optical focusing lens and one end of an optical fiber in a precisely controlled relationship thereto. The subject invention further includes a means for pivoting the maintaining means to provide fine adjustment capacity to permit relative movement of critical portions of the maintaining means by increments as little as one micron so as to vary impingement of light onto the lens. The maintaining means may include a base to assist in maintaining the lens and one end of the optical fiber in a precisely controlled relationship. The pivoting means may include at least one screw in threaded engagement with the base portion of the device. One end of the screw may contact a peripheral portion of the maintaining means so that rotation of the screw causes the maintaining means to pivot about an axis near the end of the optical fiber.

BRIEF DESCRIPTION OF THE DRAWINGS

FIG. 3 is a side view of an objective holder in the preferred embodiment;

FIG. 4 is a side view of a focusing lens;

FIG. 5 is a side view of a mount including fine adjustment screws;

FIG. 6 is a side view of a chuck holder in the preferred embodiment;

FIG. 7 is a side view of an optical fiber chuck; and

FIG. 8 is an end view of the chuck in FIG. 7.

DETAILED DESCRIPTION OF THE PREFERRED EMBODIMENT

Figure 1:
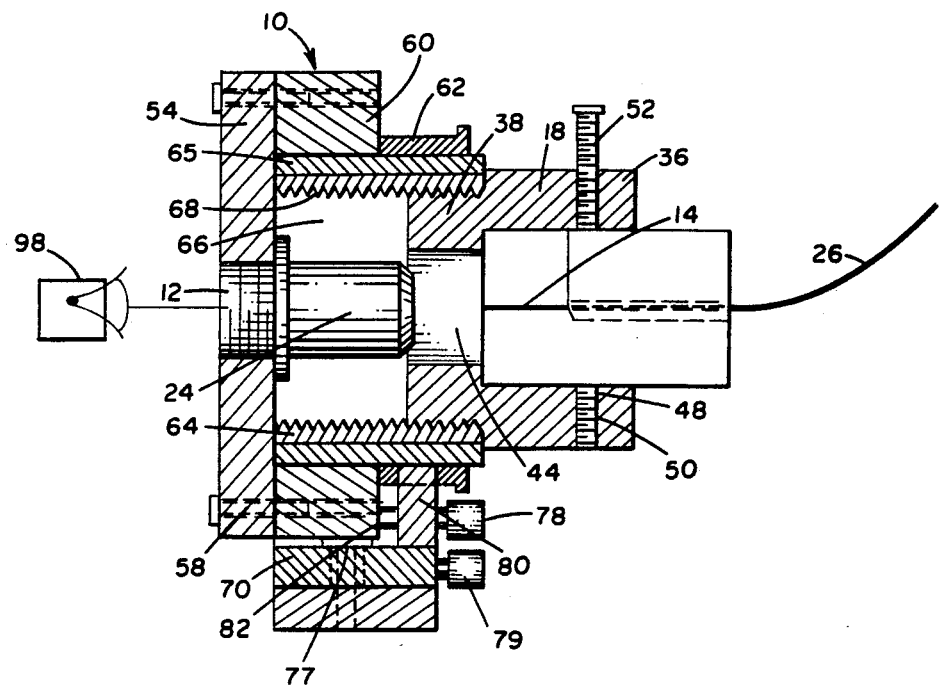
FIG. 1 is an offset section of the preferred embodiment.

The subject invention is a mounting device designated generally by the numeral 10, FIG. 1, having a means for mounting a focusing lens 12 and one end of an optical fiber 14 in a precisely controlled relationship. The mounting device 10 further includes a means for precisely adjusting the position of the focusing lens 12 and one end of an optical fiber 14 by a few microns.

Figure 2:
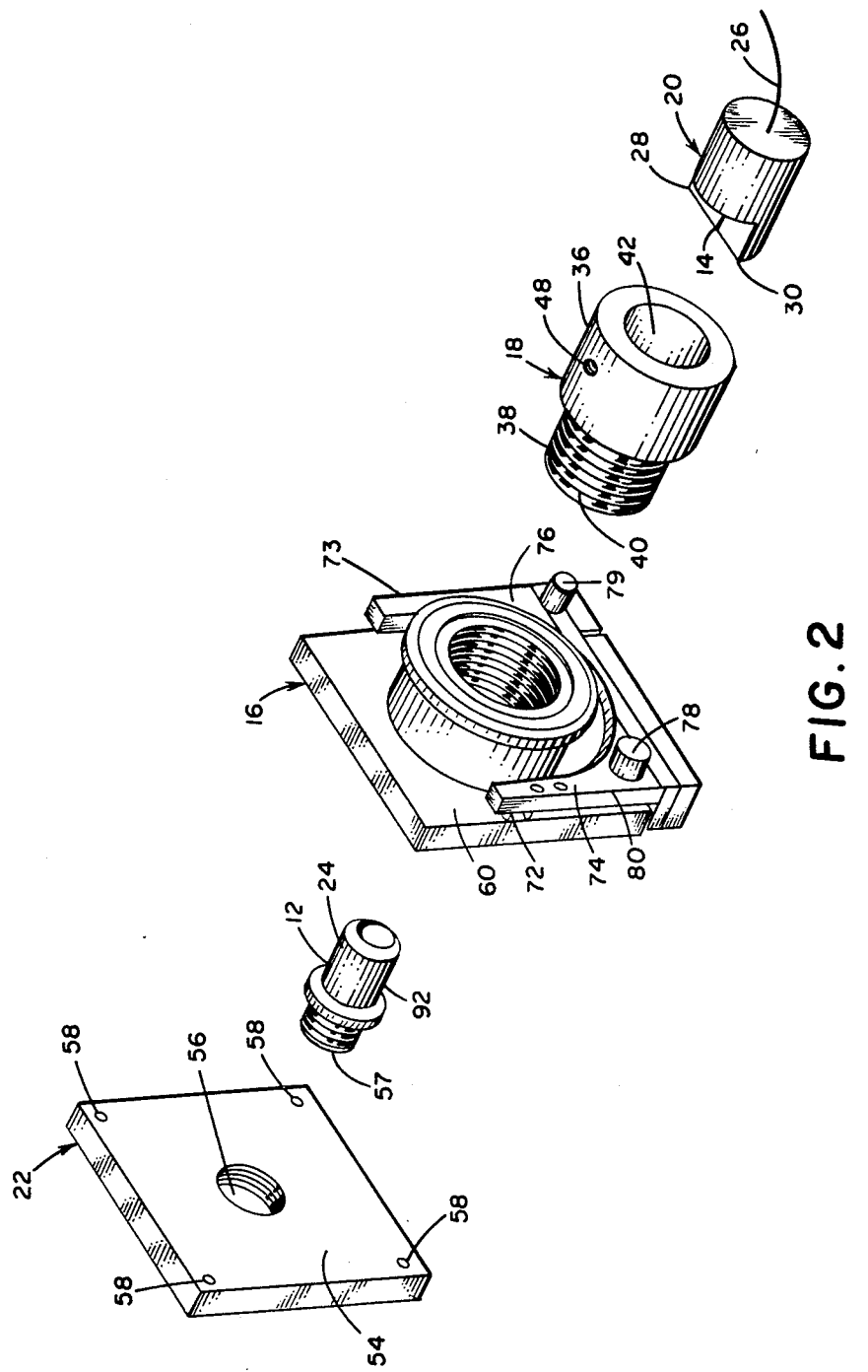
FIG. 2 is an isometric exploded view of the preferred embodiment of the subject mounting and positioning device.

The subject invention comprehends that a conventional mounting system 16, FIG. 2, for mounting an optical lens, such as the LP-1 system manufactured by N.R.C., may be modified to provide the adjustment capabilities and mounting means described above. More specifically, the subject invention comprehends that a chuck holder 18, an optical fiber chuck 20, and a means for mounting a focusing lens 92 may be used in combination with the conventional mounting system 16, as illustrated in FIGS. 1 and 2, to create a single device having both means for maintaining an optical fiber and a lens in a precisely controlled relationship and means for precisely adjusting the positions of the optical fiber and the focusing lens.

As can be seen in FIGS. 2, 7 and 8, in the preferred embodiment, the optical fiber chuck 20 is generally cylindrical device which may be made of any easily machinable material, for example, aluminum. In the preferred embodiment, a hemicylindrical portion 28 extends outwardly from the generally cylindrical chuck 20 to form a resting surface 30 for supporting one end 14 of an optical fiber 26. A generally cylindrical, axially disposed bore 32 extends through cylindrical fiber chuck 20 in the preferred embodiment. The preferred embodiment comprehends that bore 32 is lined with a relatively easily machinable material such as a soft thermoplastic resin insert 34 to protect the relatively fragile glass fiber. The insert 34 further provides an easily precisely machinable core through the cylindrical chuck 20. In the preferred embodiment, the insert may be made of a polyolefin material or an acetal such as Delrin, a registered trademark of the E.I. du Pont de Numours and Company.

Preferred embodiment comprehends the provision of a chuck holder 18 having a generally cylindrical first portion 36 and a generally cylindrical second portion 38 extending from the first cylndrical portion. The second cylindrical portion 38 is equipped with circumferentially extending threads 40 about the outer surface thereof. The chuck holder 18, in the preferred embodiment, further includes a first axial bore 42 extending substantially through the first cylindrical portion 36 of the chuck holder 18. Also in the preferred embodiment, the chuck holder 18 is further provided with a second axial bore 44 in a communication with the first axial bore. The subject invention comprehends that the second axial bore 44 has a smaller diameter than the first axial bore 42 so that an abutment surface 46 is defined at the point of communication between first and second bores 42, 44. The chuck holder 18 may be further provided with one or more radially disposed bores 48 extending from the outer surface of first cylindrical portion 36 to the first bore 42. The radially extending bores may be equipped with a threaded surface 50 to receive a maintaining screw 52, FIG. 1.

In the preferred embodiment, a means 22 for mounting a focusing lens such as a microscope objective 24 is provided. The mounting means 22 may include a rectangular objective holder 54, FIG. 3. The objective holder may be made of any easily machinable material, for example, aluminum. A centrally disposed threaded bore 56 is provided to receive the focusing lens or microscope objective 24 when the lens 24 is provided with appropriately sized threads 57 on its outer surface. A plurality of peripherally disposed bores 58 may also be provided in the objective holder 54. The bores 58 may be used to mount the objective holder 54 onto a gimbal framework 60. The gimbal framework may be of any shape. For example, it may be a generally rectangular sheet having a centrally located bore therethrough, such as the gimbal framework provided in the LP-1 or LP-1B manufactured by N.R.C. in which a centrally disposed ring 62 and cylinder 64, FIG. 1, having a rotating relationship about a stationary cylinder 65, are provided in the centrally disposed bore 66 of the gimbal framework 60.

Axially sliding cylinder 64, which is an inner moveable cylinder, is equipped with a threaded inner surface 68. The chuck holder 18 may be similarly provided with a threaded outer surface 40 of the second cylindrical portion 38 for threaded engagement with axially sliding cylinder 64 at threads 68.

Referring now to FIG. 5, the gimbal framework 60 is mounted on a base 70 and is pivotable about two axes perpendicular to the axis of the bore 66. One pivot axis is defined by bearings 72 and 73, FIG. 2, disposed on either side of bore 66 between upwardly extending legs 74 and 76, FIG. 2, of base 70, and the other pivot axis is established by bearing 77, FIG. 1, located in the base 70. Each bearing 72, 73 is disposed near the top of each corresponding upwardly extending leg so that holder 60 is pivotable about a horizontal axis. The vertical axis of rotation for the gimbal holder 60 is provided by bearing 77 in the base 70.

A screw 78 extends through an upwardly extending portion 80 of base 70. One end of the screw 78 contacts a vertical surface 82 of gimbal framework 60. Biasing means 84 maintains framework 60 in contact with screw 78. The screw 78 may be advanced toward, or retracted from, fraemwork 60 by applying a rotational force to the screw. Relatively large rotatinal movements of the screw 78 are thus translated into relatively small transverse pivotal rotation of the framework 60. For example, when the screw 78 has a threaded pitch of 0.318 millimeter per turn and the distance of the screw from bearing 72 is approximately 45 millimeters, then rotating screw 78 by 90 degrees will cause the holder to pivot about bearing 72 by an angle of $1.01 \times 10^{-1}$ degrees. A light beam directed through the focusing lens, a 20X microscope objective having a focal length of 7.5 millimeters, for example, would thus be shifted across the optical face of the fiber by 13 microns. Screw 79, utilized similarly, is used to produce controlled pivotal motion about the axis established by bearing 77, located in base 70.

Operation of the mounting device is very simple. Objective holder 54 is mounted on a gimbal framework 60 of a conventional mounting system 16. A focusing lens 24 is mounted in the centrally disposed bore 56 of the holder 54.

In a similar manner, the chuck holder 18 may be mounted on the mounting system 16 by threaded engagement with inner axially movable cylinder 64. An optical fiber 26 may have one end of the fiber threaded through centrally disposed bore 34 of the fiber chuck 20 to rest on surface 30. The fiber chuck 20 may then be inserted into first bore 42 of the fiber chuck holder. Screw 52 may then be advanced to assist in maintaining the fiber chuck 20 in a fixed position. Thus, the focusing lens 24 and one end 14 of an optical fiber 26 are caused to be maintained in a precisely controlled relationship to one another. This precisely controlled relationship may be changed, of course, by rotating ring 62 to advance or retract cylinder 64.

A light source 98 directs a narrow beam of light through focusing lens 24 into the core of the optical fiber 26. By advancing screw 78 or 79, the lens 24 is made to move across the light beam by some distance. Thus, the point of focus also moves laterally by nearly this same distance. The end 14 of the optical fiber moves also, but by a different distance. The difference in the lateral movement of the end 14 of the optical fiber and the focal point of the light passing through focusing lens 24 is determined by the focal length of the lens 24 multiplied by the angular shift of the mounting system due to the rotation of screw 78 or 79. Thus, the position of the point of focus of light from the lens onto the end 14 of the optical fiber 26 is changed and ultra-fine focusing of a laser beam onto one end of the fiber is achieved as described hereinbelow.

The subject development is particularly advantageous over the prior art because, by using screw 78 or 79 to pivot the subject mounting system having both the focusing lens and one end of the optical fiber maintained in a precisely controlled relationship, ultra-fine focal adjustment of a laser beam onto the end of the fiber is accomplished. In the preferred embodiment, this ultra-fine adjustment is accomplished by positioning the pivot screw 78 or 79 away from pivot bearing 72 or 77 by a distance that is several times greater than the distance from the nodal point of the lens to the fiber, and by translating relatively large rotational movements of screw 78 or 79 into relatively short transverse movements of the focal point of the light beam relative to the end of the fiber.

Further, by using a single mounting system to mount both one end of an optical fiber and a focusing lens, rather than a separate system for each, the cost of apparatus for mounting each element is reduced by almost 50%.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A multi-movement optical fiber and lens positioner device for impinging light from a light source through the lens into a core of the optical fiber, comprising in combination:
    maintaining means for maintaining an optical focusing lens and one end of an optical fiber in a precisely controlled relationship, said maintaining means including a gimbal means for adjusting said precisely controlled relationship by advancing or retracting said end of said optical fiber with respect to said lens; and
    means for pivoting said maintaining means to vary impingement of light onto the lens.

2. The device as described in claim 1 wherein said gimbal means includes a framework, said framework having a bore therethrough and being equipped with an axially movable cylinder about said bore, said cylinder having an inner threaded surface.

3. The device as described in claim 2 wherein said maintaining means includes a fiber chuck for receiving and maintaining one end of an optical fiber and a fiber chuck holder for maintaining said chuck, said chuck holder having outer threads for threaded engagement with said inner threaded surface of said cylinder.

4. The device as described in claim 3, wherein said chuck includes a bore lined with a resilient insert to receive and maintain said end of said optical fiber.

5. The device as described in claim 2, wherein said pivoting means includes: a base; and a screw in threaded engagement with said base having one end thereof extending through said base and contacting a peripheral portion of said maintaining means, said screw and said one end of said optical fiber being in generally parallel axial alignment wherein advancement of said screw causes said maintaining means to pivot to differentially change said generally parallel axial alignment of said screw and said end of said optical fiber to change the angle of impingement of light on both said lens and said end of said optical fiber.

6. The device described in claim 2, wherein said maintaining means further includes a fiber chuck holder having a first cylindrical portion and a second cylindrical portion extending from said first cylindrical portion, said second cylindrical portion being equipped with a threaded outer surface, said chuck holder further including an axial bore extending through said first and second cylindrical portions.

7. The device as described in claim 6, wherein said maintaining means includes a fiber chuck for insertion in said axial bore of said chuck holder having a generally cylindrical portion having a bore through the axis thereof, said bore being lined with a resilient thermoplastic resin for receiving and maintaining one end of said optical fiber, said chuck having a hemicylindrical extension at one end thereof to allow one end of said optical fiber to be directed through said bore of said chuck and rest on said hemicylindrical extension.

8. The device as described in claim 7, wherein said axial bore extending through said chuck holder includes first and second interconnected portions, said first portion of said bore extending partially through said first cylindrical portion to engagingly receive said chuck, said second portion of said bore extending through said second cylindrical portion of said chuck holder to interconnect with said first portion of said bore, said second portion of said bore having a smaller diameter than the outer diameter of said cylindrical portion of said fiber chuck, the interconnection of said first and second portions of said bore having an interface defining an abutment surface.

9. An assembly for maintaining one end of an optical fiber comprising:
    a fiber chuck having a generally cylindrical portion provided with a bore through the axis thereof, said bore being lined with a resilient thermoplastic resin for receiving and maintaining one end of an optical fiber, said chuck having a hemicylindrical extension at one end thereof to allow one end of said optical fiber to be directed through said bore and rest on said hemicylindrical extension; and
    a chuck holder having a first cylindrical portion and a second cylindrical portion extending from said first cylindrical portion, said chuck holder further including an axial bore extending through said first and second cylindrical portions for receiving said chuck, said axial bore including first and second interconnecting portions, said first portion of said bore extending partially through said first cylindrical portion to engagingly receive said chuck, said second portion of said bore extending through said second cylindrical portion of said chuck holder to interconnect with said first portion of said bore, said second portion of said bore having a smaller diameter than the outer diameter of said cylindrical portion of said fiber chuck, the interconnection of said first and second portions of said bore having an interface defining an abutment surface.

* * * * *